United States Patent [19]

Mouille et al.

[11] Patent Number: 5,242,130
[45] Date of Patent: Sep. 7, 1993

[54] METHOD AND DEVICE FOR THE REDUCTION OF THE OSCILLATIONS OF A DIVERGENT NATURE OF THE FUSELAGE OF A HELICOPTER

[75] Inventors: Rene L. Mouille; Philippe Roesch, both of Aix en Provence, France

[73] Assignee: Aerospatiale Societe Nationale Industrielle, Paris, France

[21] Appl. No.: 905,453

[22] Filed: Jun. 29, 1992

[30] Foreign Application Priority Data

Jul. 2, 1991 [FR] France ........................ 91 08224

[51] Int. Cl.$^5$ ............................................ B64C 27/54
[52] U.S. Cl. ............................ 244/17.13; 244/17.27; 416/500; 416/31
[58] Field of Search ............... 244/17.11, 17.13, 17.27; 416/500, 31

[56] References Cited

U.S. PATENT DOCUMENTS

| | | | |
|---|---|---|---|
| 3,520,498 | 7/1970 | Murphy | 244/17.27 |
| 3,570,786 | 3/1971 | Lewis, II | 244/17.13 |
| 3,795,375 | 3/1974 | Lemnios | 244/17.127 |
| 3,954,229 | 4/1976 | Wilson . | |
| 4,073,600 | 2/1978 | Doman . | |
| 4,819,182 | 4/1989 | King . | |
| 4,937,758 | 6/1990 | Hayden et al. | 244/17.11 |

FOREIGN PATENT DOCUMENTS

| | | |
|---|---|---|
| 2736409 | 2/1979 | Fed. Rep. of Germany . |
| 936775 | 9/1946 | France . |
| 2063969 | 10/1969 | France . |
| 2592696 | 1/1986 | France . |
| 2149473 | 6/1985 | United Kingdom ............. 244/17.13 |

OTHER PUBLICATIONS

French Search Report in applications' corresponding French patent application–Institut National Propriete Industrielle–Jul. 2, 1991.

*Primary Examiner*—Galen Barefoot
*Attorney, Agent, or Firm*—Fisher, Christen & Sabol

[57] ABSTRACT

Method and device for the reduction of the oscillations of a divergent nature induced in the fuselage (2) of a helicopter (1) by its rotary wings (3) when they are turning. According to the invention, the oscillations are detected (at 17, 18) and they are converted (at 19, 20) into electrical signals, which are used (at 13) in order to produce pitch variations of the blades (4) of the rotary wings (3), in such a way that a rotating torque vector opposing said oscillations results.

12 Claims, 2 Drawing Sheets

METHOD AND DEVICE FOR THE REDUCTION OF THE OSCILLATIONS OF A DIVERGENT NATURE OF THE FUSELAGE OF A HELICOPTER

The present invention relates to a method and a device for the reduction of the oscillations of a divergent nature of the fuselage of a helicopter.

It is known that, when the rotor of a helicopter is turning, the fuselage of the latter may be subjected, at certain rotor angular speeds, to low-frequency oscillations which can be violent and divergent when the airframe is on the ground or even, but more rarely, in flight. It is known, moreover, that this phenomenon results from a coupling between the vibratory drag movement of the blades of the rotor and the movements of the fuselage. In fact, the vibratory drag movement of the blades induces, in the fuselage, longitudinal and lateral forces which, in their turn, give rise to displacements of the head of the rotor, augmenting the drag movement of the blades of the rotor.

When the helicopter is resting on the ground by its landing gear, rotor turning, the phenomenon above becomes unstable when the characteristic angular frequency of the fuselage on the ground is close to the difference $\Omega - \omega\delta$ between the angular frequency of the rotor $\Omega$ and the characteristic angular frequency $\omega\delta$ of the first natural drag vibration mode of the blades. This instability is designated by "ground resonance".

When the helicopter is in flight, the action of the undercarriage disappears and the characteristic angular frequency of the fuselage corresponds to that of the pendular movement of the helicopter suspended under the rotor. The instability can appear again, but it then needs a smaller $\Omega - \omega\delta$ difference, since the frequencies of the fuselage of the helicopter are lower in flight than on the ground. This instability is designated by "air resonance".

However, whether it is on the ground or in flight, the helicopter risks being damaged or destroyed if the instability condition $\Omega - \omega\delta$ is reached.

In order to avoid this drawback, it is usual to mount dampers on the landing gears and/or provide blade drag dampers on the rotor head, as is, for example, described in patents FR-A-936 775, FR-A-2 063 969 and FR-A-2 592 696. However, the installation of such dampers on the rotor head leads to a certain complexity in the latter and to additional weight and cost price. Moreover, on fast modern helicopters, these dampers interfere with the production of an effective fairing of the rotor head, so that the aerodynamic drag of the latter remains high and reduces performance.

Another known means for reducing or suppressing the phenomena of ground resonance and air resonance is described in Pat. No. US-A-4 073 600.

In this case, the tilting of the rotor at the frequency $\Omega - \omega\delta$ in the fixed axes generates a signal at the same frequency whose transmission, hydraulically, produces corrective displacements in the maneuvering rod assembly of the cyclic plate, in series or in parallel with the control command. This then results in a modification in the positioning of the blades, around their respective pitch articulation whose axis is parallel to the wingspan of the blade, and, consequently, a modification of the rotating torque vector of the forces and moments created by the rotor in such a way as to favorably oppose the excitations resulting from the initial rotating torque vector.

However, such a means can be applied only to a rotor articulated on a hub via a cardan-type joint arranged on the upper extremity of the mast.

This results, therefore, in mechanical complexity in the helicopter and an application which is limited in practice to the use of four-blade rotors with an oscillating hub.

The object of the present invention is to treat the problems of ground resonance and of air resonance, without introducing the drawbacks mentioned above.

To that end, according to the invention, the method for the reduction of the oscillations of a divergent nature induced in the fuselage of a helicopter by its rotary wings when they are turning, said helicopter resting on the ground by means of its landing gear, is noteworthy in that:

the roll movements of the fuselage of said helicopter on the ground are detected, and a detection signal is generated which is representative of said roll movements on the ground;

on the basis of said detection signal which is representative of the roll movements on the ground, there is formed, on board said helicopter, a signal for roll control on the ground whose frequency is identical to that of said detection signal which is representative of the roll movements on the ground;

said signal for roll control on the ground is applied to a least one first actuator arranged in the kinematic control chain for the cyclic pitch of the blades of said rotary wings; and the phase and the amplitude of said signal for roll control on the ground are such that the action of said first actuator on said cyclic pitch results in the appearance of a set of forces and moments generated by the rotary wings and opposing, in roll and on the ground, the effect of said oscillations of a divergent nature on the fuselage.

Thus, by virtue of the maneuvering of the cyclic plate, a rotating torque vector is generated on the head of the rotor, resulting from the forces and the moments created on the blades, in permanent opposition to the effect of the rotating excitation torque vector resulting from the forces and the moments created by the free oscillations of the blades in drag.

Preferably, so as also to eliminate the divergent oscillations induced in pitch, on the ground, in the fuselage of the helicopter by its rotary wings, the method according to the invention is noteworthy in that, moreover:

the pitch movements of the fuselage of said helicopter on the ground are detected, and a detection signal is generated which is representative of said pitch movements on the ground;

on the basis of said detection signal which is representative of the pitch movements on the ground, there is formed, on board said helicopter, a signal for pitch control on the ground whose frequency is identical to that of said detection signal which is representative of the pitch movements on the ground;

said signal for pitch control on the ground is applied to at least one second actuator arranged in the kinematic control chain for the cyclic pitch of the blades of said rotary wings; and the phase and the amplitude of said signal for pitch control on the ground are such that the action of said second actuator on said cyclic pitch results in the appearance of a set of forces and moments generated by the rotary wings and opposing, in pitch and on the ground, the effect of said oscillations of a divergent nature on the fuselage.

Similarly, the method of the invention can be employed for the reduction of the oscillations induced in the fuselage of a helicopter by its rotary wings when they are turning, when said helicopter is in flight, suspended by said rotary wings.

In this case, when it is desired to reduce said roll oscillations, this method according to which:

a) the oscillatory movements of the fuselage of said helicopter are detected in flight and at least one detection signal is generated which is representative of said oscillatory movements in flight;

b) on the basis of said detection signal which is representative of the oscillatory movements in flight, there is formed, on board said helicopter, a signal for control of the oscillations in flight whose frequency is identical to that of said detection signal which is representative of said oscillatory movements in flight; and c) said signal for control of the oscillations in flight is applied to at least one first actuating member intended, by its action, to counteract said induced oscillations, is noteworthy in that:

in operation a), the oscillatory roll movements of said fuselage are detected and a detection signal which is representative of said oscillatory roll movements in flight is generated, such that, in operation b), said signal for control of the oscillations in flight is a signal for roll control in flight;

in operation c), said first actuating member is arranged in the kinematic control chain for the cyclic pitch of the blades of said rotary wings; and the phase and the amplitude of said signal for roll control in flight are such that the action of said first actuating member on said cyclic pitch results in the appearance of a set of forces and moments generated by the rotary wings and opposing, in roll and in flight, the effect of said oscillations of a divergent nature on the fuselage.

Here again, when a reduction of pitch oscillations is necessary, the method is noteworthy in that, moreover:

the pitch oscillatory movements of the fuselage are detected in flight and a detection signal is generated which is representative of said pitch oscillatory movements in flight;

on the basis of said detection signal which is representative of the pitch oscillatory movements in flight, there is formed, on board said helicopter, a signal for pitch control in flight whose frequency is identical to that of said detection signal which is representative of the pitch oscillatory movements in flight;

said signal for pitch control in flight is applied to at least one second actuating member arranged in the kinematic control chain for the cyclic pitch of the blades of said rotary wings; and the phase and the amplitude of said signal for pitch control in flight are such that the action of said second actuating member on said cyclic pitch results in the appearance of a set of forces and moments generated by the rotary wings and opposing, in pitch and in flight, the effect of said oscillations of a divergent nature on the fuselage.

The present invention also relates to a device for the reduction of the oscillations of a divergent nature induced in the fuselage of a helicopter by its rotary wings when they are turning, said helicopter resting on the ground by means of its landing gear.

In the case where the reduction in the pitch oscillations is sufficient, this device comprises:

means for detecting the roll movements, on the ground, of the fuselage of said helicopter and for generating a detection signal which is representative of said roll movements on the ground;

means arranged on board said helicopter and generating, on the basis of said detection signal which is representative of the roll movements on the ground, a signal for roll control on the ground whose frequency is identical to that of said detection signal which is representative of the roll movements on the ground; and at least one first actuator to which said signal for roll control on the ground is applied and which is arranged in the kinematic control chain for the cyclic pitch of the blades of the rotary wings;

the phase and the amplitude of said signal for roll control on the ground being such that the action of said first actuator on said cyclic pitch results in the appearance of a set of forces and moments generated by the rotary wings and opposing, in roll and on the ground, the effect of said oscillations of a divergent nature on the fuselage.

If it is also desired to reduce the pitch oscillations, this device moreover comprises:

means for detecting the pitch movements, on the ground, of the fuselage of said helicopter and for generating a detection signal which is representative of said pitch movements on the ground;

means arranged on board said helicopter and generating, on the basis of said detection signal which is representative of the pitch movements on the ground, a signal for pitch control on the ground whose frequency is identical to that of said detection signal which is representative of the pitch movements on the ground; and at least one second actuator to which said signal for pitch control on the ground is applied and which is arranged in the kinematic control chain for the cyclic pitch of the blades of the rotary wings;

the phase and the amplitude of said signal for pitch control on the ground being such that the action of said second actuator on said cyclic pitch results in the appearance of a set of forces and moments generated by the rotary wings and opposing, in pitch and on the ground, the effect of said oscillations of a divergent nature on the fuselage.

In this device, said first and second actuators be gathered together in the same functional assembly.

Moreover, the invention relates to a device for the reduction of the oscillations induced in the fuselage of a helicopter by its rotary wings when they are turning, when said helicopter in flight is suspended by said rotary wings, this device being of the type comprising:

a') means for detecting the oscillatory movements of the fuselage of said helicopter in flight and for generating a detection signal which is representative of said oscillatory movements in flight;

b') means arranged on board said helicopter and generating, on the basis of said detection signal which is representative of the oscillatory movements in flight, a signal for control of the oscillations in flight whose frequency is identical to that of said detection signal which is representative of said oscillatory movements in flight; and c') a first actuating member intended by its action to counteract said induced oscillations, and to which said signal for control of the oscillations in flight is applied, According to the invention, this device is noteworthy in that:

the means specified under a') detect the roll oscillatory movements of said fuselage and generate a detection signal which is representative of said roll oscillatory movements in flight, such that said signal for control of the oscillations in flight specified under b') is a signal for roll control in flight;

said first actuating member is arranged in the kinematic control chain for the cyclic pitch of the blades of said rotary wings; and the phase and the amplitude of said signal for roll control in flight are such that the action of said first actuating member on said cyclic pitch results in the appearance of a set of forces and moments generated by the rotary wings and opposing, in roll and in flight, the effect of said oscillations of a divergent nature on the fuselage.

It is advantageous that, in order to reduce the pitch oscillations, this device moreover comprises:

means for detecting the pitch oscillatory movements of the fuselage in flight and for generating a detection signal which is representative of said pitch oscillatory movements in flight;

means arranged on board said helicopter and generating, on the basis of said detection signal which is representative of the pitch oscillatory movements in flight, a signal for control of the oscillations in flight whose frequency is identical to that of said detection signal which is representative of the pitch oscillatory movements in flight; and at least one second actuating member to which said signal for pitch control in flight is applied and which is arranged in the kinematic control chain for the cyclic pitch of the blades of said rotary wings;

the phase and the amplitude of said signal for pitch control in flight being such that the action of said second actuating member on said cyclic pitch results in the appearance of a set of forces and moments generated by said rotary wings and opposing, in pitch and in flight, the effect of said oscillations of a divergent nature on the fuselage.

Said first and second actuating members may be gathered together in the same functional assembly; possibly, the latter can also comprise said first and second actuators mentioned above.

The figures of the attached drawing will make it easy to understand how the invention can be embodied. In these figures, identical references designate similar elements.

Figure 1:
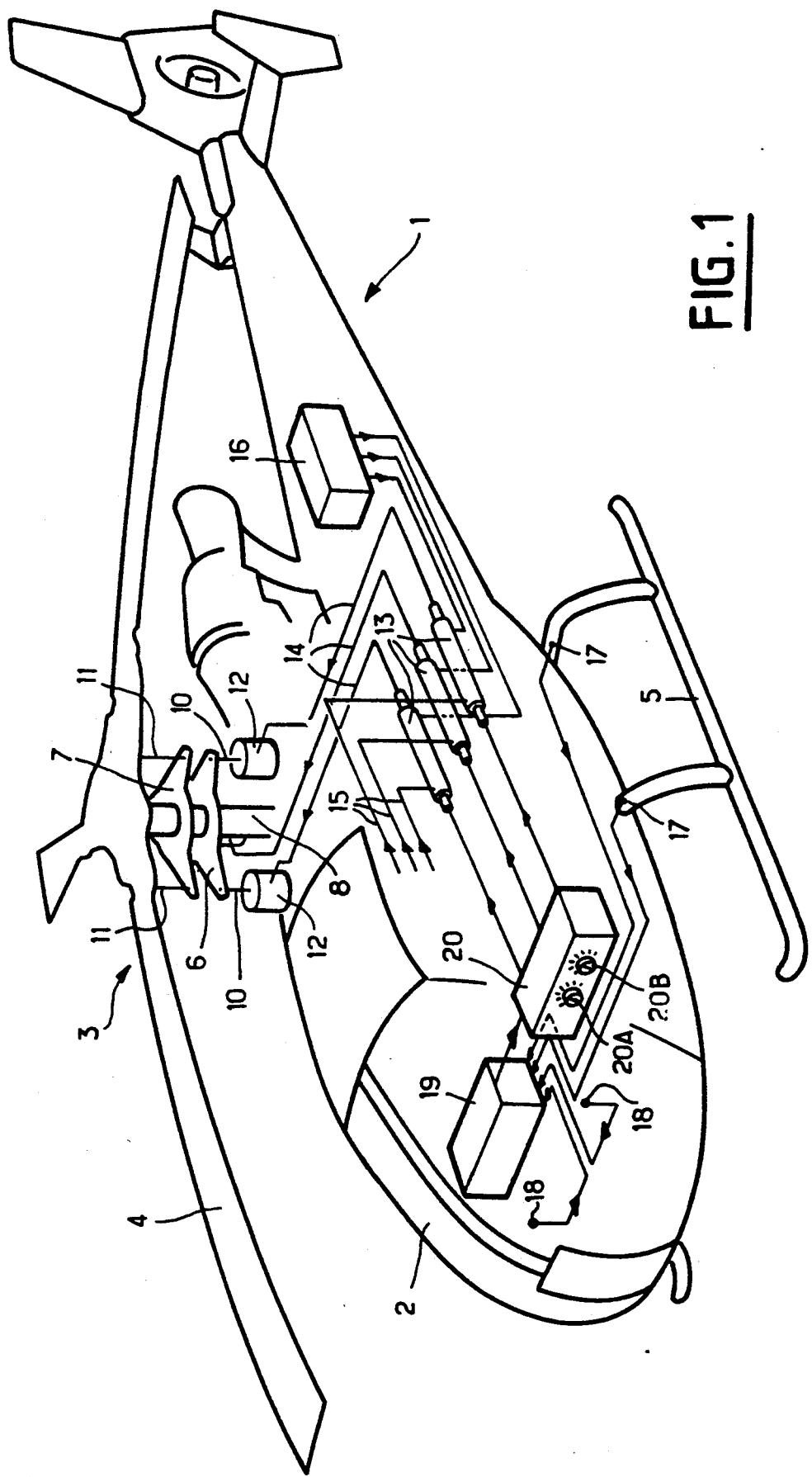
FIG. 1 shows, diagrammatically and in perspective, a helicopter in accordance with the present invention.

The helicopter 1, in accordance with the present invention and diagrammatically represented in perspective in FIG. 1, comprises a fuselage 2 and rotary wings 3 comprising blades 4. A landing gear 5, integral with the fuselage 2, is provided for resting the helicopter 1 on a take-off or landing area, designated in a general way in the present description by "ground".

In a known way, the helicopter 1 comprises a cyclic plate constituted by a non-rotating plate 6 with respect to which a rotating plate 7 can rotate. The non-rotating plate 6 can not only slide along the mast 8 of the rotary wings 3, but can also oscillate in every direction around said mast, by virtue of a ball joint 9 (not shown in FIG. 1 but visible in FIGS. 2 and 3). The position and the orientation of the non-rotating plate 6 are controlled by control connecting rods 10, while the pitch of the blades 4 is controlled by pitch connecting rods 11 linked to said rotating plate 7. Each control connecting rod 10 is controlled, in translation parallel to its axis, by a servocontrol 12. In the example shown in FIG. 1, each servocontrol 12 is itself controlled by an actuator 13 by means of a rod assembly 14, the actuator 13 receiving orders from the pilot or the automatic pilot by means of links 15. The actuators 13, which are, for example, electric jacks, are supplied by an energy source 16.

The application of the present invention to control of the pitch of the blades by a cyclic plate is given by way of a description but is not limiting. For example, it could also be used if the control of the pitch of the blades is effected by means of a known device, known in general by the name "spider".

In accordance with the invention, the helicopter 1 comprises detectors 17 of roll and pitch oscillations on the ground, as well as detectors 18 of roll and pitch oscillations in flight.

The detectors 17 can be simple potentiometers measuring the deformations or the movements of the landing gear 5 when the helicopter 1 is resting on the ground and when its rotary wings 3 are turning. They can also be constituted by attitude detectors or rate gyros, which are very often installed on board the helicopter 1 for the requirements of IFR flight and of the automatic pilot, or even by accelerometers measuring longitudinal and/or lateral accelerations of the fuselage.

The detectors 18 can be constituted, by way of example, by attitude detectors or rate gyros. If required, the detectors 17 can be removed, their role being played by the detectors 18. Preferably, for reasons of reliability, it is important to provide at least two detectors 17 and/or 18.

The oscillatory signals given out by the detectors 17 and 18, which are representative respectively of the oscillations from ground resonance and air resonance, are transmitted to a detection, filtering and amplification device 19, which addresses them to a processing device 20 controlling the actuators 13 in parallel with the links 15.

Hence, the signals given out by the detectors 17 and 18 can control the pitch of the blades 4, via the actuators 13, the rod assemblies 14, the servocontrols 12, the control connecting rods 10, the cyclic plate 6, 7 and the pitch connecting rods 11.

The amplitude and the phase of the signals detected by the detectors 17 and 18 are adjusted by the processing device 20, such that attitude movements by the cyclic plate 6, 7 (and hence a variation of the pitch of the blades 4) result, at the frequency of the oscillations of said detected signals, in order to reduce, then suppress the roll and pitch oscillations induced by said rotary rings in the fuselage 2.

The processing device 20 is provided with adjustment means 20A, 20B available to the helicopter crew 1, in order to permit the amplitude and/or the phase of the signals originating from the detectors 17 and 18 to be adjusted, so as to perfect elimination of the oscillations induced by the rotary rings 3 in the fuselage 2. It is obvious that these adjustments are also capable of being produced by appropriate automation.

Over and above a desirable plurality of detectors 17 and 18 as mentioned above, the architecture of the device may comprise at least a duplication of certain constituent elements in order to guarantee the safety of the helicopter.

In the diagrammatic embodiment of FIG. 2 are again shown the blades 4, the plates 6 and 7, the mast 8, the ball joint 9, the control connecting rods 10, the pitch connecting rods 11, the servocontrols 12, the detectors 18 and the devices 19 and 20 (grouped together into a single device 19, 20). A device 19, 20 is associated with each detector 18. In this variant, additional servocontrols 21 are provided, for example hydraulic servocontrols with servo valves having electrohydraulic inlets, each of which is mounted in series with a main servocontrol 12. The additional servocontrols 21 directly receive the electrical signals given out from the corresponding device 20. Hence, in this case, the cyclic pitch variation necessary for piloting is generated by the main servocontrols 12 (controlled for example as is described with respect to FIG. 1), while the pitch variation intended, according to the invention, for the reduction of the oscillations induced by the rotary rings in the fuselage results from the action of the additional servocontrols 21.

Figure 2:
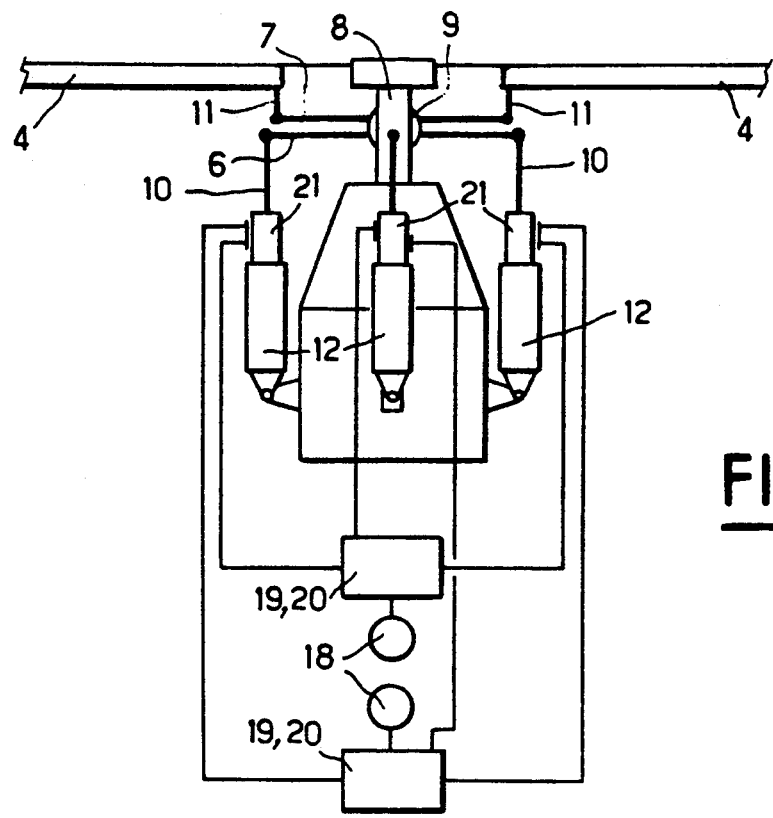
FIGS. 2 and 3 illustrate, diagrammatically and in a simplified way, embodiment variants of FIG. 1.
Figure 3:
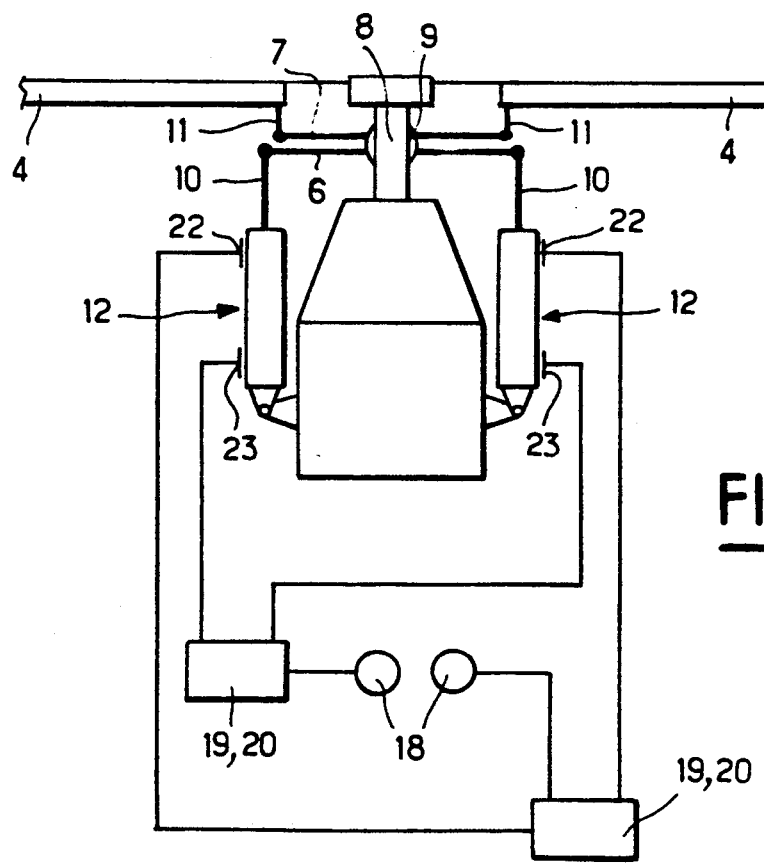

FIG. 3 illustrates, in the manner of FIG. 2, a simplified variant of the device according to the invention, permitting only reduction of the roll oscillations of the fuselage. This variant comprises two main hydraulic servocontrols 12, each having two electrical inlets via servo valves 22 and 23, said main servocontrols 12 being diametrically opposite with respect to the mast 8. For each servocontrol 12, the inlet 22 receives the electrical signal originating from a device 20 associated with a detector 18, while the inlet 23 receives the signal originating from a device 20 associated with another detector 18. Hence, the cyclic plate 6, 7 can be made to oscillate laterally in opposition with the induced oscillations. Needless to say, the servocontrols 12 are furthermore controllable (in a way which is not shown) by the pilot or the automatic pilot.

We claim:

1. A method for the reduction of the oscillations of a divergent nature induced in the fuselage (2) of a helicopter (1) by its rotary wings (3) when they are turning, said helicopter resting on the ground by means of its landing gear (5), the method comprising:

detecting (at 17, 18) the roll movements of the fuselage of said helicopter on the ground, and generating a detection signal which is representative of said roll movements on the ground;

forming (at 20), on board said helicopter, on the basis of said detection signal which is representative of the roll movements on the ground, a signal for roll control on the ground whose frequency is identical to that of said detection signal which is representative of the roll movements on the ground;

applying said signal for roll control on the ground to at least one first actuator (13, 12, 21) arranged in the kinematic control chain for the cyclic pitch of the blades (4) of said rotary wings (3); and causing the action of said first actuator on said cyclic pitch, due to the phase and the amplitude of said signal for roll control on the ground, to result in the appearance of a set of forces and moments generated by the rotary wings and opposing, in roll and on the ground, the effect of said oscillations of a divergent nature on the fuselage.

2. The method as claimed in claim 1 wherein, moreover:

detecting the pitch movements of the fuselage of said helicopter on the ground, and generating a detection signal is generated which is representative of said pitch movements on the ground;

forming, on board said helicopter, on the basis of said detection signal which is representative of the pitch movements on the ground, a signal for pitch control on the ground whose frequency is identical to that of said detection signal which is representative of the pitch movements on the ground;

applying said signal for pitch control on the ground to at least one second actuator arranged in the kinematic control chain for the cyclic pitch of the blades of said rotary wings; and causing the action of said second actuator on said cyclic pitch, due to the phase and the amplitude of said signal for pitch control on the ground, to result in the appearance of a set of forces and moments generated by the rotary wings and opposing, in pitch and on the ground, the effect of said oscillations of a divergent nature on the fuselage.

3. A method for the reduction of the oscillations induced in the fuselage of a helicopter by its rotary wings when they are turning, said helicopter being suspended by said rotor, the method according to which:

(a) detecting the oscillatory movements of the fuselage of said helicopter in flight and generating at least one detecting signal which is representative of said oscillatory movements in flight;

(b) forming, on board said helicopter, on the basis of said detection signal which is representative of the oscillatory movements in flight, a signal for control of the oscillations in flight whose frequency is identical to that of said detection signal which is representative of said oscillatory movements in flight; and (c) applying said signal for control of the oscillations in flight to at least one first actuating member intended, by its action, to counteract said induced oscillations, wherein:

in operation (a), detecting the oscillatory roll movements of said fuselage and generating a detection signal which is representative of said oscillatory roll movements in flight, such that, in operation (b), said signal for control of the oscillations in flight is a signal for roll control in flight;

in operation (c), arranging said first actuating member in the kinematic control chain for the cyclic pitch of the blades of said rotary wings; and causing the action of said first actuating member on said cyclic pitch, due to the phase and the amplitude of said signal for roll control in flight, to result in the appearance of a set of forces and moments generated by the rotary wings and opposing, in roll and in flight, the effect of said oscillations of a divergent nature on the fuselage.

4. The method as claimed in claim 3, wherein, moreover:

detecting the pitch oscillatory movements of the fuselage in flight and generating a detection signal which is representative of said pitch oscillatory movements in flight;

forming, on board said helicopter, on the basis of said detection signal which is representative of the pitch oscillatory movements in flight, a signal for pitch control in flight whose frequency is identical to that of said detection signal which is representative of the pitch oscillatory movements in flight;

applying said signal for pitch control in flight to at least one second actuating member arranged in the kinematic control chain for the cyclic pitch of the blades of said rotary wings; and causing action of said second actuating member on said cyclic pitch, due to the phase and the amplitude of said signal for pitch control in flight, to result in the appearance of a set of forces and moments generated by the rotary wings and opposing, in pitch and in flight, the effect of said oscillations of a divergent nature on the fuselage.

5. A device for the reduction of the oscillations of a divergent nature induced in the fuselage (2) of a helicopter (1) by its rotary wings (3) when they are turning, said helicopter resting on the ground by means of its landing gear (5), which comprises:

means (17, 18) for detecting the roll movements, on the ground, of the fuselage of said helicopter and for generating a detection signal which is representative of said roll movements on the ground;

means (19, 20) arranged on board said helicopter and generating, on the basis of said roll movements detection signals, a signal for roll control on the ground whose frequency is identical to that of said roll movements detection signal; and at least one first actuator (12, 13, 21) to which said roll control signal is applied and which is arranged in the kinematic control chain for the cyclic pitch of the blades of the rotary wings;

the phase and the amplitude of said roll control signal being such that the action of said first actuator on said cyclic pitch results in the appearance of a set of forces and moments generated by the rotary wings and opposing, in roll and on the ground, the effect of said oscillations of a divergent nature on the fuselage.

6. The device as claimed in claim 5 which comprises, moreover:

means (17, 18) for detecting the pitch movements, on the ground, of the fuselage (2) of said helicopter and for generating a detection signal which is representative of said pitch movements on the ground;

means arranged on board said helicopter and generating, on the basis of said pitch movements detection signal, a signal for pitch control on the ground whose frequency is identical to that of said pitch movements detection signal; and at least one second actuator (12, 13, 21) to which said pitch control signal is applied and which is arranged in the kinematic control chain for the cyclic pitch of the blades of the rotary wings;

the phase and the amplitude of said pitch control signal being such that the action of said second actuator on said cyclic pitch results in the appearance of a set of forces and moments generated by the rotary wings and opposing, in pitch and on the ground, the effect of said oscillations of a divergent nature on the fuselage.

7. The device as claimed in claim 5 wherein said actuators and actuating members are constituted by jacks (13) controlling the servocontrols (12) for pitch control, in parallel with the piloting control (15).

8. The device as claimed in claim 5 wherein said actuators and actuating members are constituted by additional servocontrols (21) mounted in series with the main servocontrols (12) for pitch control.

9. The device as claimed in claim 5 wherein said actuators and actuating members are constituted by the servocontrols (12) for pitch control.

10. A device for the reduction of the oscillations induced in the fuselage (2) of a helicopter by its rotary wings (3) when they are turning, said helicopter being suspended by said rotor, the device comprising:

(a') means for detecting the oscillatory movements of the fuselage of said helicopter in flight and for generating a detection signal which is representative of said oscillatory movements in flight;

(b') means (19, 20) arranged on board said helicopter and generating, on the basis of said oscillatory movements detection signal, a signal for control of the oscillation in flight whose frequency is identical to that of said oscillatory movements detection signal; and (c') a first actuating member (12, 13, 21) intended by its action to counteract said induced oscillations, and to which is oscillations control signal is applied, wherein, the means (17, 18) specified under (a') detects the roll oscillatory movements of said fuselage (2) and generates a detection signal which is representative of said roll oscillatory movements in flight, such that said oscillations control specified under (b') is a signal for roll control in flight;

said first actuating member (11, 13, 21) is arranged in the kinematic control chain for the cyclic pitch of the blades of said rotary wings; and the phase and the amplitude of said roll control signal are such that the action of said first actuating member on said cyclic pitch results in the appearance of a set of forces and moments generated by the rotary wings and opposing, in roll and in flight, the effect of said oscillations of a divergent nature on the fuselage.

11. The device as claimed in claim 10 which moreover comprises:

means (17, 18) for detecting the pitch oscillatory movements of the fuselage in flight and for generating a detection signal which is representative of said pitch oscillatory movements in flight;

means (19, 20) arranged on board said helicopter and generating, on the basis of said pitch oscillation movements detection signals, a signal for control of the oscillations in flight whose frequency is identical to that of said pitch oscillatory movements detection signal; and at least one second actuating member to which said pitch control signal is applied and which is arranged in the kinematic control chain for the cyclic pitch of the blades of said rotary wings;

the phase the the amplitude of said pitch control signal being such that the action of said second actuating member on said cyclic pitch results in the appearance of a set of forces and moments generated by said rotary wings and opposing, in pitch and in flight, the effect of said oscillations of a divergent nature on the fuselage.

12. A helicopter which comprises the device specified under any one of claims 5 to 9 for the reduction of the oscillations of a divergent nature induced in its fuselage (2) by its wings (3) when they are turning.

* * * * *